US011939881B2

(12) United States Patent
Murata et al.

(10) Patent No.: US 11,939,881 B2
(45) Date of Patent: Mar. 26, 2024

(54) GAS TURBINE ROTOR BLADE AND GAS TURBINE

(71) Applicant: MITSUBISHI HEAVY INDUSTRIES, LTD., Tokyo (JP)

(72) Inventors: Ryo Murata, Tokyo (JP); Yuji Komagome, Tokyo (JP); Naoya Tatsumi, Tokyo (JP); Hiroki Kitada, Tokyo (JP); Shunsuke Torii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/125,306

(22) Filed: Mar. 23, 2023

(65) Prior Publication Data

US 2023/0392505 A1 Dec. 7, 2023

(30) Foreign Application Priority Data

Apr. 21, 2022 (JP) ................................ 2022-070022

(51) Int. Cl.
*F01D 5/18* (2006.01)
*F01D 5/14* (2006.01)
(Continued)

(52) U.S. Cl.
CPC ................ *F01D 5/18* (2013.01); *F01D 5/14* (2013.01); *F01D 5/141* (2013.01); *F01D 5/147* (2013.01);
(Continued)

(58) Field of Classification Search
CPC ........ F01D 5/141; F01D 5/147; F01D 5/3007; F01D 21/045; F01D 5/143; F01D 5/18;
(Continued)

(56) References Cited

U.S. PATENT DOCUMENTS 4,120,607 A * 10/1978 Coplin ................. F01D 21/045 416/193 A
5,924,699 A 7/1999 Airey et al.
(Continued)

FOREIGN PATENT DOCUMENTS

JP 8-254103 10/1996
JP 10-196309 7/1998
(Continued)

*Primary Examiner* — Brian Christopher Delrue
(74) *Attorney, Agent, or Firm* — Wenderoth, Lind & Ponack, L.L.P.

(57) ABSTRACT

A platform of a gas turbine rotor blade according to one embodiment includes a groove portion recessed from an end surface on a trailing edge side toward a leading edge side. A bottom portion of the groove portion overlaps at least a blade-shaped portion when viewed from a radial direction. When a pressure-side end portion of the platform with respect to the bottom portion is defined as a first point, a tangent line that is a tangent line with respect to the bottom portion, extending along a plane intersecting the radial direction at the first point is defined as a first tangent line, when an intersection between a line segment connecting the bottom portion and an end portion on the trailing edge side of a serpentine cooling flow path provided inside the blade-shaped portion when viewed from the radial direction and an end portion on the trailing edge side of the blade-shaped portion is defined as a second point, a tangent line that is a tangent line with respect to the bottom portion, extending along the plane at the second point is defined as a second tangent line, and when an intersection between the first tangent line and the second tangent line when viewed from the radial direction is defined as a third point. As viewed from the radial direction, the third point exists on a side opposite to the end portion on the trailing edge side of the blade-shaped portion across a straight line connecting the first point and the second point.

8 Claims, 7 Drawing Sheets

(51) Int. Cl.
*F01D 21/04* (2006.01)
*F04D 29/32* (2006.01)
*F04D 29/38* (2006.01)

(52) U.S. Cl.
CPC ........... *F01D 5/187* (2013.01); *F01D 21/045* (2013.01); *F04D 29/324* (2013.01); *F04D 29/38* (2013.01); *F04D 29/384* (2013.01); *F05D 2220/32* (2013.01); *F05D 2240/30* (2013.01); *F05D 2260/20* (2013.01)

(58) Field of Classification Search
CPC . F01D 5/14; F01D 5/187; F01D 25/12; F05D 2240/80; F05D 2260/94; F05D 2260/941; F05D 2260/80; F05D 2260/81; F05D 2240/81; F05D 2220/32; F05D 2240/30; F05D 2260/20; F05D 2240/303; F05D 2240/304; Y02T 50/60; F04D 29/324; F04D 29/38; F04D 29/384; F05B 2240/80; F05B 2240/81
See application file for complete search history.

(56) References Cited

U.S. PATENT DOCUMENTS

| | | | | |
|---|---|---|---|---|
| 5,947,687 | A * | 9/1999 | Mori | F01D 5/147 416/193 A |
| 6,390,775 | B1 * | 5/2002 | Paz | F01D 5/147 416/193 A |
| 6,761,536 | B1 * | 7/2004 | Bash | F01D 5/30 416/193 A |
| 6,951,447 | B2 * | 10/2005 | Cherolis | F01D 5/147 416/193 A |
| 8,550,783 | B2 | 10/2013 | Dietrich et al. | |
| 8,876,479 | B2 * | 11/2014 | Thomen | F01D 5/22 416/193 A |
| 9,359,905 | B2 * | 6/2016 | Lamicq | F01D 5/3007 |
| 2005/0095129 | A1 | 5/2005 | Benjamin et al. | |
| 2005/0135936 | A1 * | 6/2005 | Cherolis | F01D 5/147 416/193 A |
| 2008/0063529 | A1 * | 3/2008 | Miller | F01D 5/147 416/193 A |
| 2010/0129228 | A1 * | 5/2010 | Strohl | F01D 5/141 416/239 |
| 2012/0251331 | A1 * | 10/2012 | Dietrich | F01D 5/187 416/97 R |
| 2016/0084088 | A1 * | 3/2016 | Evans | F01D 5/141 416/239 |
| 2022/0154581 | A1 * | 5/2022 | Wakazono | F01D 5/145 |

FOREIGN PATENT DOCUMENTS

| | | |
|---|---|---|
| JP | 2001-271603 | 10/2001 |
| JP | 2002-213205 | 7/2002 |
| JP | 2005-180431 | 7/2005 |
| JP | 2005-307981 | 11/2005 |

* cited by examiner

GAS TURBINE ROTOR BLADE AND GAS TURBINE

CROSS-REFERENCE TO RELATED APPLICATIONS

This application claims the benefit of priority to Japanese Patent Application Number 2022-070022 filed on Apr. 21, 2022. The entire contents of the above-identified application are hereby incorporated by reference.

TECHNICAL FIELD

The disclosure relates to a gas turbine rotor blade and a gas turbine.

RELATED ART

In a gas turbine rotor blade, a difference in temperature and thermal stress are likely to occur between a blade portion and a platform in a transient state such as when the gas turbine is started or when the gas turbine is stopped. This thermal stress is known to particularly increase in the vicinity of a root part between a trailing edge of the blade portion and the platform. To deal with this, a gas turbine rotor blade in which a groove portion is formed in the platform to reduce such thermal stress is known (see, for example, JP 8-254103 A). In this configuration, the groove portion is formed to be recessed from an end portion of the platform on the trailing edge side toward the leading edge side and extending in a rotor circumferential direction.

SUMMARY

In the turbine rotor blade, a serpentine cooling flow path is formed inside the blade portion for cooling the blade portion. This serpentine cooling flow path extends over a range in the blade length direction that includes at least a part of the platform. Therefore, the groove portion formed in the platform needs to be formed at a position where a wall thickness with the serpentine cooling flow path is ensured. Therefore, there is a limitation in the depth of the groove portion.

In view of the above circumstances, an object of at least one embodiment of the disclosure is to provide a gas turbine rotor blade capable of effectively suppressing thermal stress generated in a gas turbine rotor blade.

(1) A gas turbine rotor blade according to at least one embodiment of the disclosure includes:

a base end portion fixed to a rotor;

a blade-shaped portion extending in a radial direction of the rotor and having a pressure-side blade surface and a suction-side blade surface, the blade surfaces forming a blade shape between a leading edge and a trailing edge of the blade-shaped portion; and a platform provided between the base end portion and the blade-shaped portion, in which the platform includes a groove portion recessed from an end surface on the trailing edge side toward the leading edge side and extending in a circumferential direction of the rotor, a bottom portion of the groove portion overlaps at least the blade-shaped portion when viewed from the radial direction, when a pressure-side end portion of the platform with respect to the bottom portion is defined as a first point, a tangent line that is a tangent line with respect to the bottom portion, extending along a plane intersecting the radial direction at the first point is defined as a first tangent line, when an intersection between a line segment connecting the bottom portion and an end portion on the trailing edge side of a serpentine cooling flow path provided inside the blade-shaped portion when viewed from the radial direction and an end portion on the trailing edge side of the blade-shaped portion is defined as a second point, a tangent line that is a tangent line with respect to the bottom portion, extending along the plane at the second point is defined as a second tangent line, and when an intersection between the first tangent line and the second tangent line when viewed from the radial direction is defined as a third point, when viewed from the radial direction, the third point exists on a side opposite to the end portion on the trailing edge side of the blade-shaped portion across a straight line connecting the first point and the second point.

(2) A gas turbine according to at least one embodiment of the disclosure includes:

the rotor; and the gas turbine rotor blade having the configuration of (1) fixed to the rotor at the base end portion.

According to at least one embodiment of the disclosure, it is possible to effectively suppress thermal stress generated in a gas turbine rotor blade.

BRIEF DESCRIPTION OF DRAWINGS

The disclosure will be described with reference to the accompanying drawings, wherein like numbers reference like elements.

DESCRIPTION OF EMBODIMENTS

Figure 1:
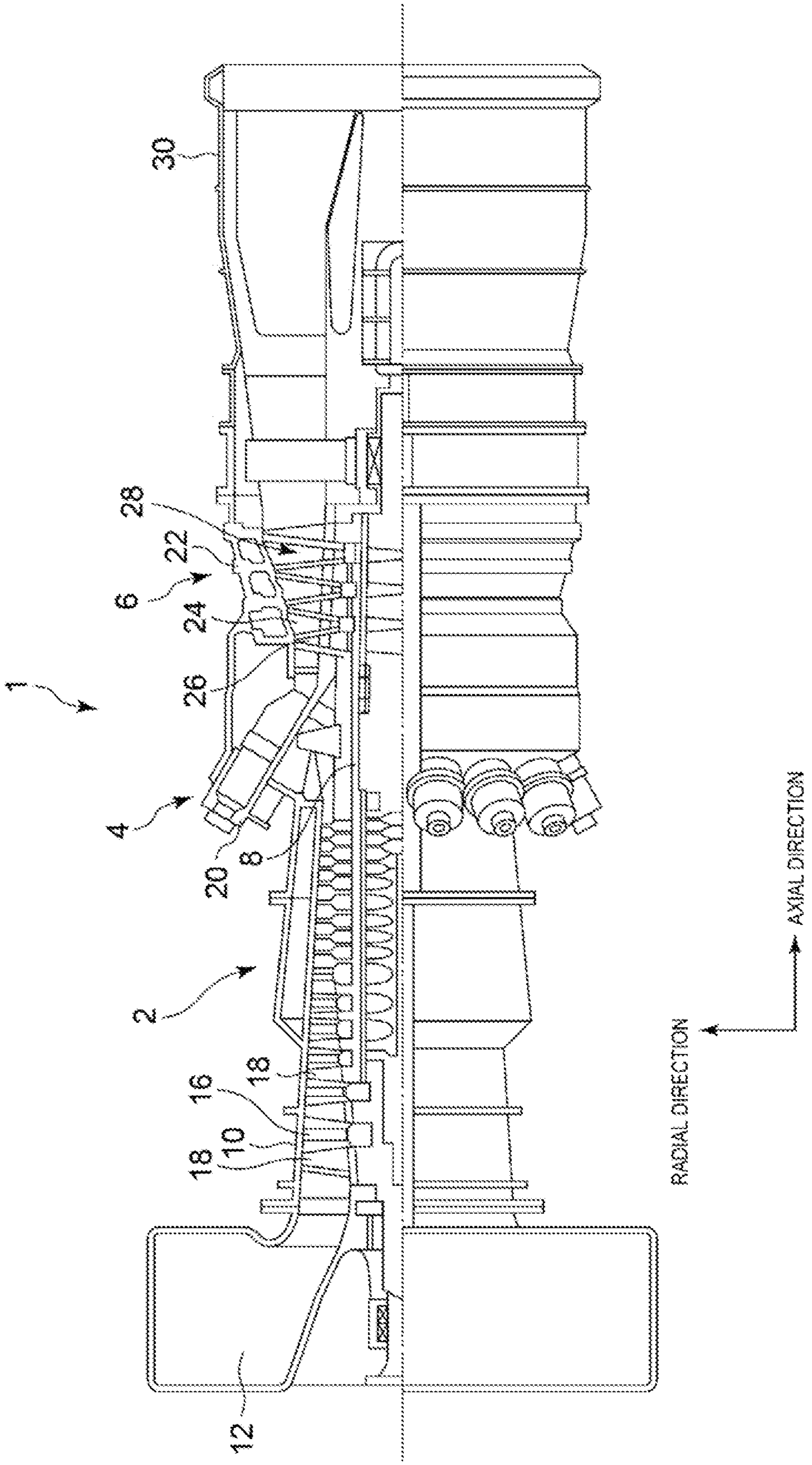
FIG. 1 is a schematic configuration diagram of a gas turbine to which a gas turbine rotor blade according to some embodiments is applied.

Some embodiments of the disclosure will now be described with reference to the accompanying drawings. However, the dimensions, materials, shapes, relative dispositions, or the like of components described in the embodiments or illustrated in the drawings are not intended to limit the scope of the disclosure and are merely illustrative examples.

For example, expressions indicating relative or absolute arrangement such as “in a direction”, “along a direction”, “parallel”, “orthogonal”, “center”, “concentric”, or “coaxial” shall not be construed as indicating only such arrangement in a strict literal sense but also as indicating a state of being relatively displaced by a tolerance, or by an angle or a distance as long as the same function can be obtained.

For example, expressions indicating a state of being equal such as "same," "equal," or "uniform" shall not be construed as indicating only a state of being strictly equal, but also as indicating a state where there is a tolerance or a difference that can still achieve the same function.

For example, expressions indicating a shape such as a rectangular shape or a tube shape shall not be construed as only indicating a shape such as a rectangular shape or a tube shape in a strict geometrical sense but also as indicating a shape including depressions, protrusions, and chamfered corners as long as the same effect can be obtained.

On the other hand, expressions such as "provided", "comprise", "contain", "include", or "have" are not intended to be exclusive of other components.

Gas Turbine 1

First, a gas turbine to which a gas turbine rotor blade according to some embodiments is applied will be described.

FIG. 1 is a schematic configuration diagram of the gas turbine to which the gas turbine rotor blade according to some embodiments is applied. As illustrated in FIG. 1, a gas turbine 1 includes a compressor 2 for generating compressed air, a combustor 4 for generating combustion gas using compressed air and fuel, and a turbine 6 configured to be rotationally driven by combustion gas. In a case of the gas turbine 1 for power generation, a generator not illustrated is connected to the turbine 6.

The compressor 2 includes a plurality of stator vanes 16 fixed to a compressor casing 10 side, and a plurality of rotor blades 18 implanted in a rotor 8 so as to be alternately arrayed with respect to the stator vanes 16.

The air taken in from an air intake port 12 is sent to the compressor 2, and this air is compressed through the plurality of stator vanes 16 and the plurality of rotor blades 18, thereby becoming high-temperature and high-pressure compressed air.

Fuel and compressed air that is generated by the compressor 2 are supplied to the combustor 4, and the fuel is combusted in the combustor 4 to generate combustion gas that is a working fluid of the turbine 6. As illustrated in FIG. 1, a plurality of the combustors 4 may be arranged in a casing 20 along the circumferential direction about the rotor 8.

The turbine 6 has a combustion gas flow path 28 formed in the turbine casing 22, and includes a plurality of stator vanes 24 and rotor blades 26 provided in the combustion gas flow path 28.

The stator vanes 24 are fixed to the turbine casing 22 side, and the plurality of stator vanes 24 arrayed along the circumferential direction of the rotor 8 constitute a stator vane row. The rotor blades 26 are implanted in the rotor 8, and the plurality of rotor blades 26 arrayed along the circumferential direction of the rotor 8 constitute a rotor blade row. The stator vane row and the rotor blade row are alternately arrayed in an axial direction of the rotor 8.

In the turbine 6, the combustion gas from the combustor 4 flowing into the combustion gas flow path 28 passes through the plurality of stator vanes 24 and the plurality of rotor blades 26, so that the rotor 8 is rotationally driven, whereby the generator connected to the rotor 8 is driven to generate electric power. The combustion gas after driving the turbine 6 is discharged to the outside via an exhaust chamber 30.

In some embodiments, the rotor blade 26 of the turbine 6 may be a gas turbine rotor blade 40 described below.

Gas Turbine Rotor Blade 40

Figure 2:
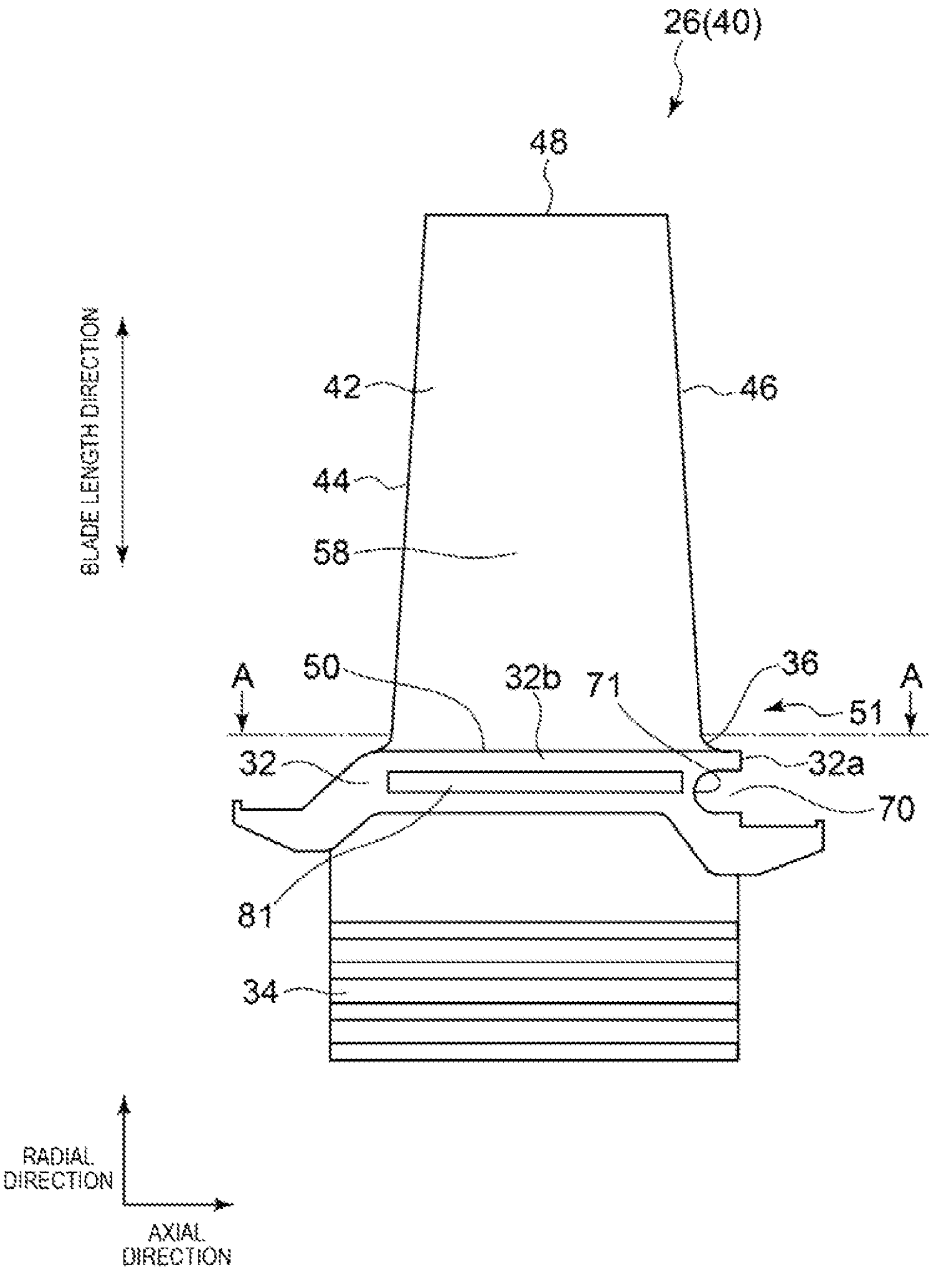
FIG. 2 is a view of a rotor blade (gas turbine rotor blade) according to some embodiments as viewed from the suction-side.

FIG. 2 is a view of the rotor blade 26 (gas turbine rotor blade 40) according to some embodiments as viewed from the suction-side.

Figure 3A:
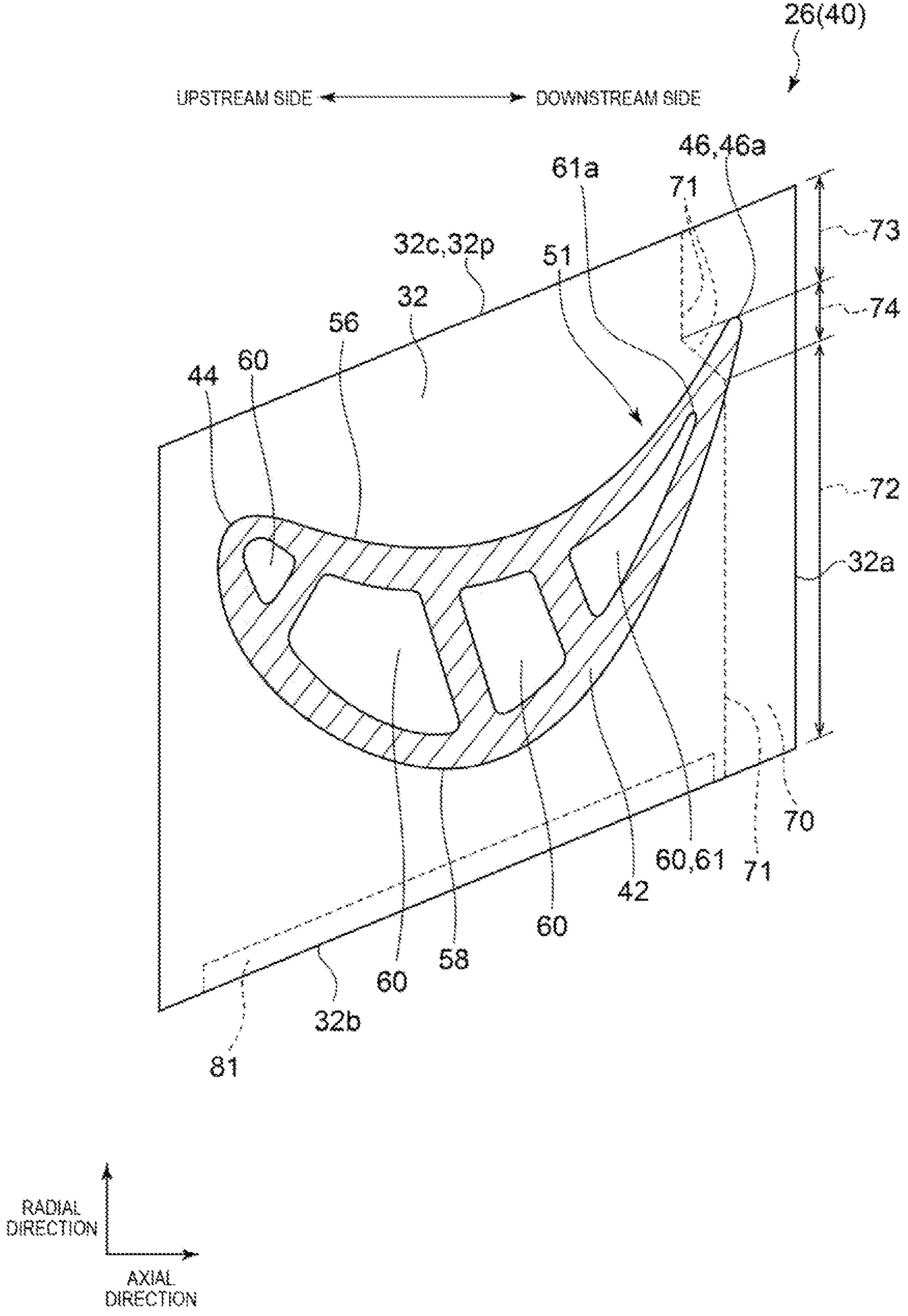
FIG. 3A is a view illustrating an example of the A-A cross section in FIG. 2.

FIG. 3A is a view illustrating an example of A-A cross section of FIG. 2.

Figure 3B:
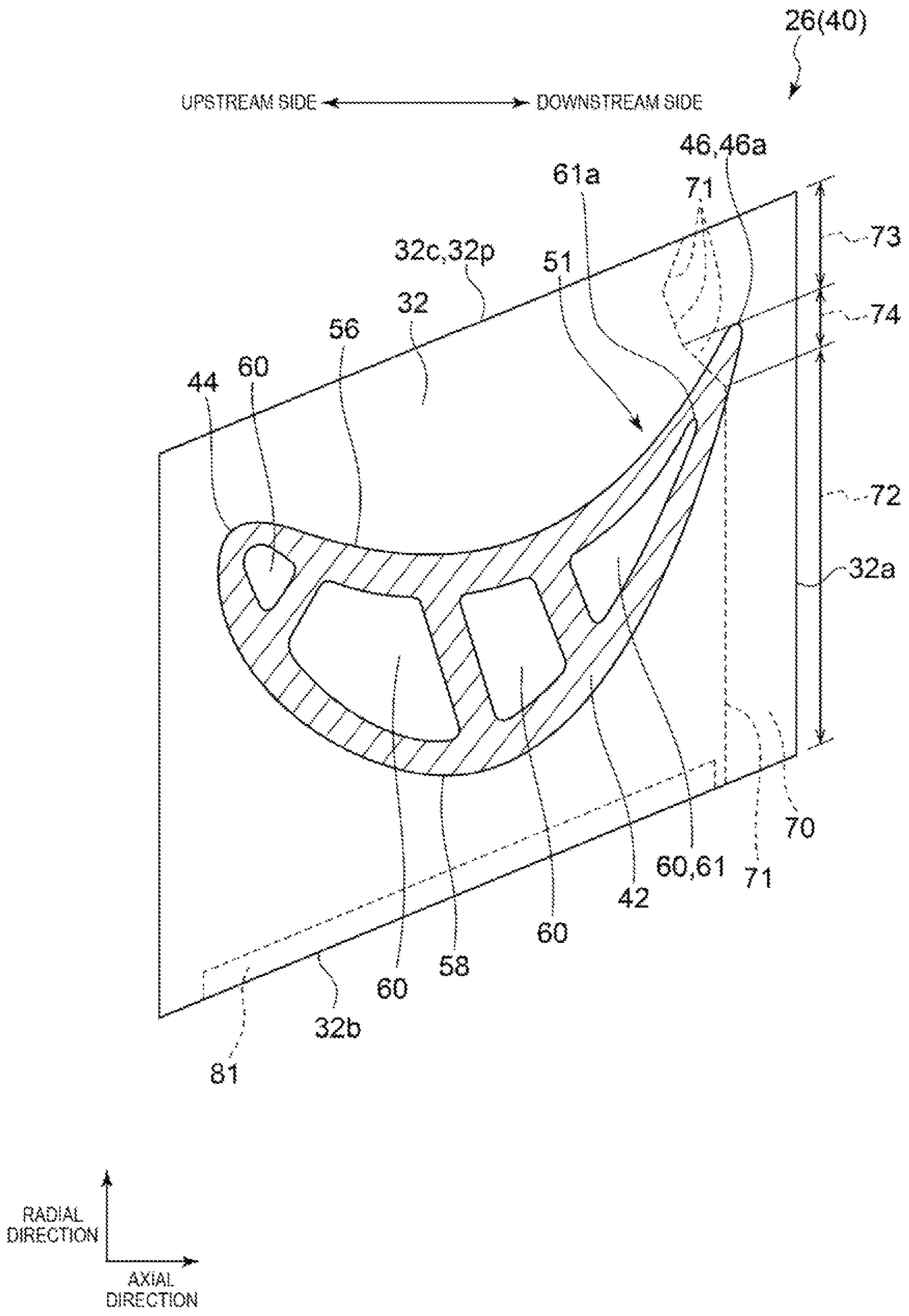
FIG. 3B is a view illustrating another example of the A-A cross section in FIG. 2.

FIG. 3B is a view illustrating another example of A-A cross section of FIG. 2.

Figure 3C:
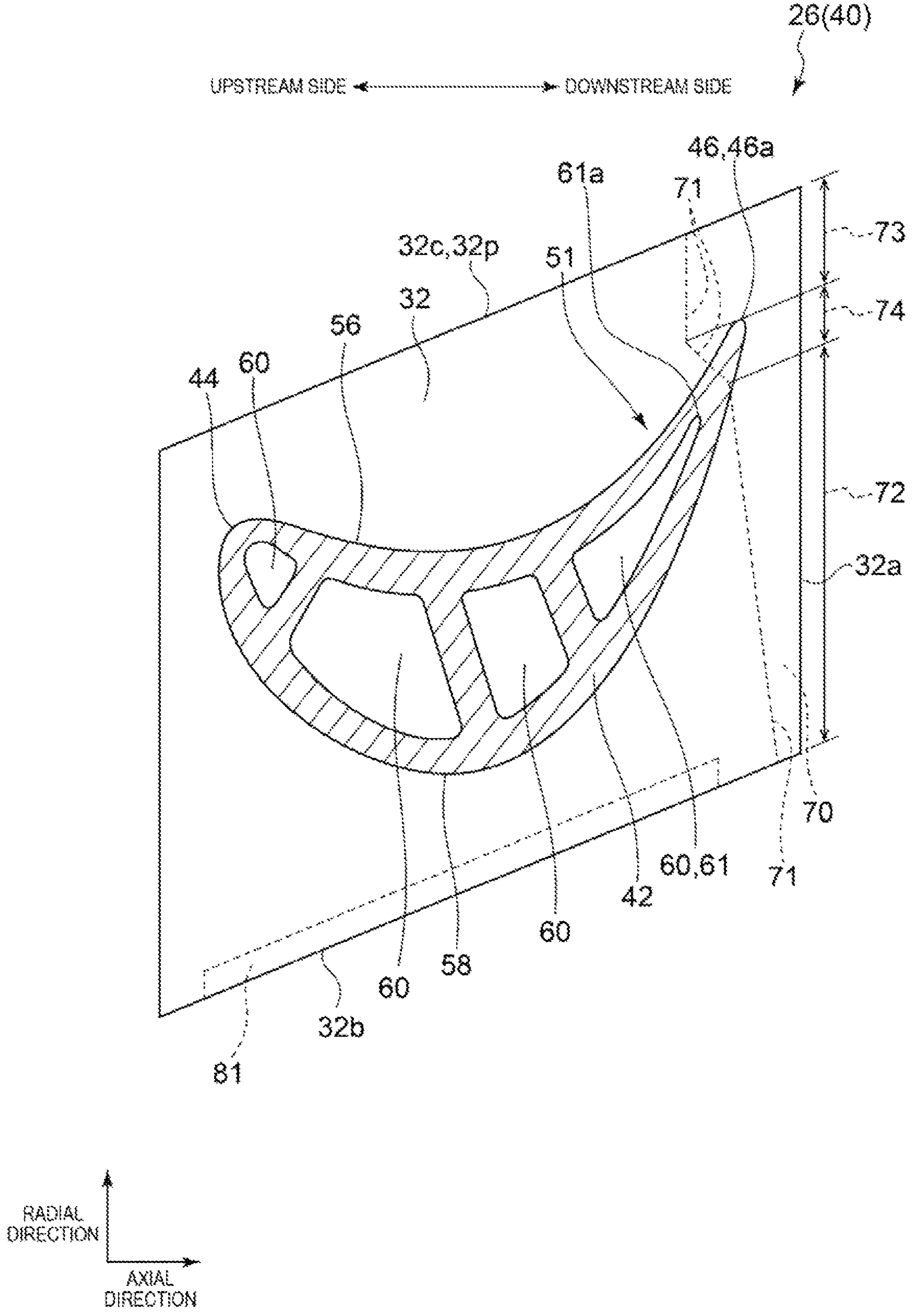
FIG. 3C is a view illustrating still another example of the A-A cross section in FIG. 2.

FIG. 3C is a view illustrating still another example of A-A cross section of FIG. 2.

Figure 3D:
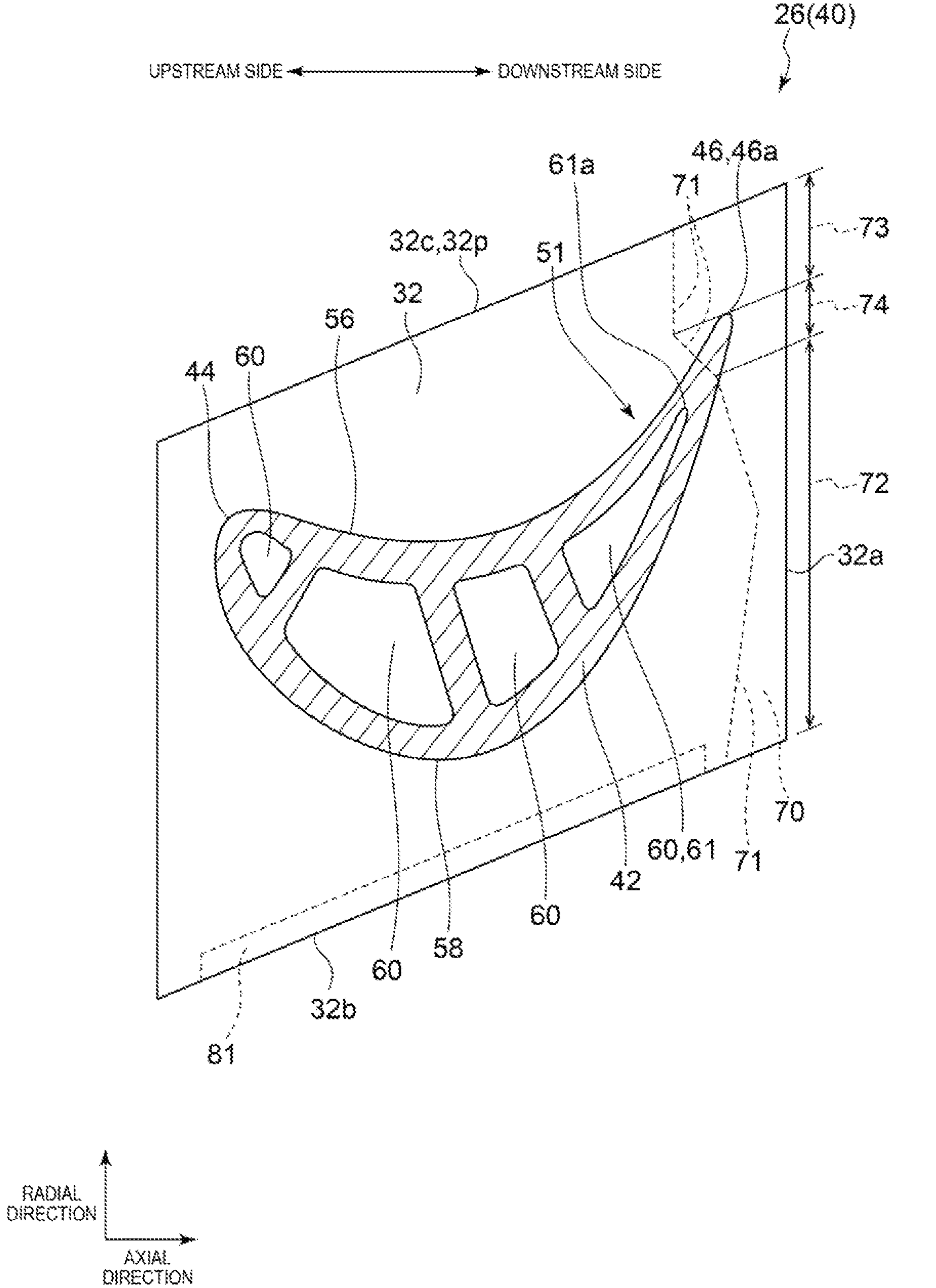
FIG. 3D is a view illustrating yet another example of the A-A cross section in FIG. 2.

FIG. 3D is a view illustrating yet another example of A-A cross section of FIG. 2.

Figure 4:
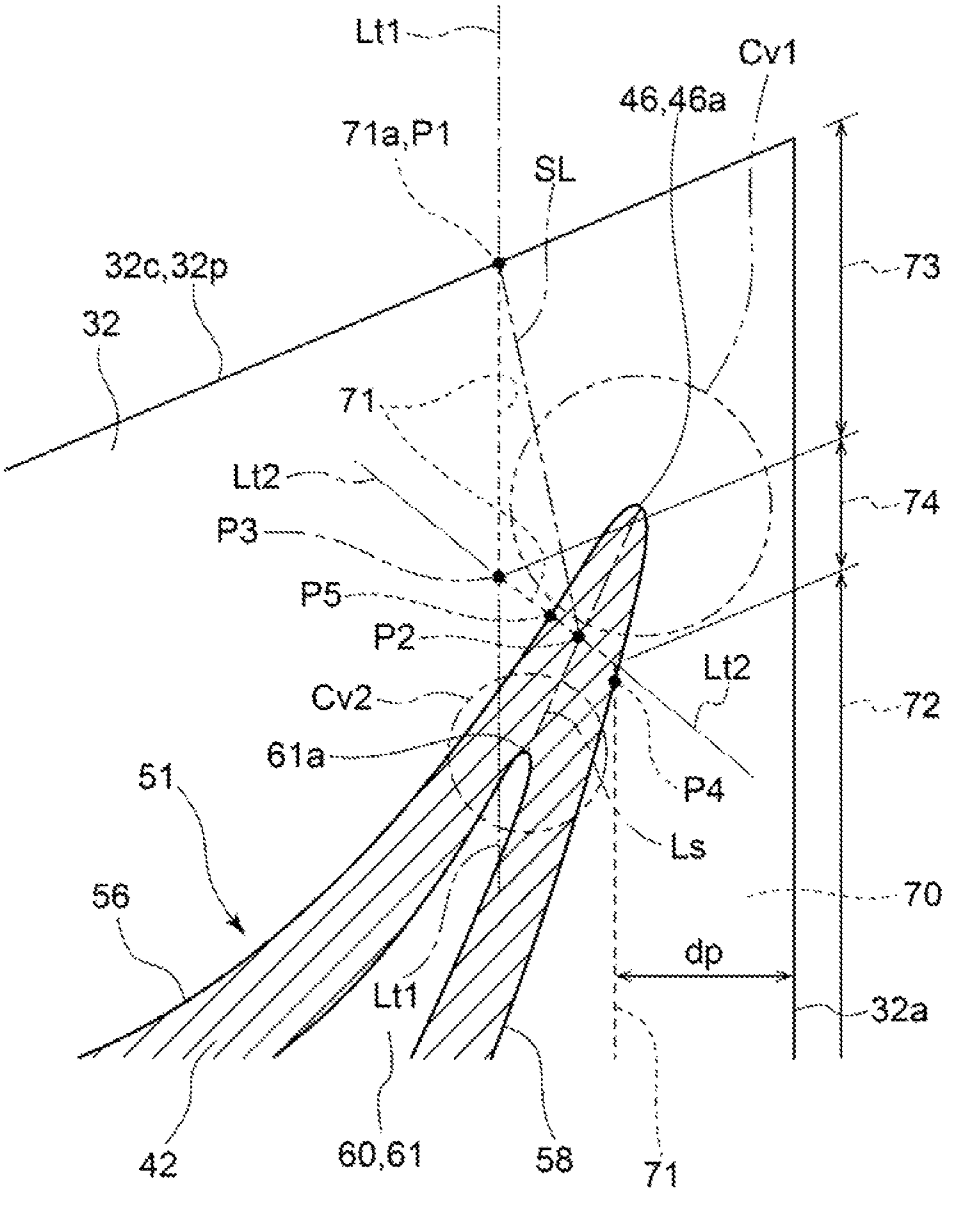
FIG. 4 is a view for explaining a shape of a groove portion.

FIG. 4 is a view for explaining the shape of a groove portion 70, and gives the groove portion 70 illustrated in FIG. 3A as an example.

A-A cross section illustrated in FIGS. 3A, 3B, 3C, and 3D represents a cross section of a blade portion 42 at an end portion on the outer side in the radial direction of the rotor 8 (hereinafter, also referred to as simply "radial direction") in a fillet portion 36 described below.

As illustrated in FIGS. 2, 3A, 3B, 3C, and 3D, the rotor blade 26, which is the gas turbine rotor blade 40 according to some embodiments, includes the blade portion (blade-shaped portion) 42, a platform 32, and a blade root portion (base end portion) 34. The blade root portion 34 is embedded in the rotor 8 (see FIG. 1), and the rotor blade 26 rotates together with the rotor 8. The platform 32 is configured integrally with the blade root portion 34.

The blade portion 42 is provided to extend along the radial direction of the rotor 8 (hereinafter, also referred to as simply "radial direction"), and has a base end 50 fixed to the platform 32 and a tip 48 positioned on the opposite side of the base end 50 in the blade length direction (radial direction of the rotor 8).

The blade portion 42 of the rotor blade 26 has a leading edge 44 and a trailing edge 46 from the base end 50 to the tip 48, and the blade surface of the blade portion 42 includes a pressure side (pressure surface) 56 and a suction side (suction surface) 58 extending along the blade length direction (radial direction) between the base end 50 and the tip 48.

As illustrated in FIGS. 3A, 3B, 3C, and 3D, the inside of the blade portion 42 is provided with a cooling flow path 60 extending along the blade length direction of the blade portion 42. A cooling fluid (for example, air) for cooling the gas turbine rotor blade 40 flows through the cooling flow path 60. By supplying the cooling flow path 60 with the cooling fluid, the blade portion 42 provided in the combustion gas flow path 28 of the turbine 6 and exposed to a high-temperature combustion gas is cooled.

In some embodiments, the cooling flow path 60 extends over a range in the blade length direction that includes at least a part of the blade portion 42 and the platform 32.

The gas turbine rotor blade 40 may have a plurality of the cooling flow paths 60. The cooling flow path 60 may further extend over the blade root portion 34.

The fillet portion 36 is formed at a base end portion 51, which is a part of the blade portion 42 on the base end 50 side. The blade portion 42 is then connected to the platform 32 via the fillet portion 36.

As illustrated in FIGS. 2, 3A, 3B, 3C, and 3D, in the rotor blade 26 according to some embodiments, the platform 32 includes the groove portion recessed from an end surface 32*a* on the trailing edge 46 side toward the leading edge 44 side and extending in the circumferential direction of the rotor 8 (hereinafter, also referred to as simply "circumferential direction").

In the rotor blade 26, a temperature difference is liable to occur between the blade portion 42 and the platform 32, and thermal stress is liable to occur in a transient state such as when the operation of the gas turbine 1 is started or when the operation is stopped. It has been found that this thermal stress is particularly liable to increase in the vicinity of the root part between the trailing edge 46 of the blade portion 42 and the platform 32. Therefore, the above-described thermal stress is reduced by forming, in the platform 32, the groove portion 70 formed to be recessed from the end surface 32*a* on the trailing edge 46 side of the platform 32 toward the leading edge 44 side and extending in the circumferential direction of the rotor 8.

The groove portion 70 will be described in detail below.

As illustrated in FIGS. 2, 3A, 3B, 3C, and 3D, in the rotor blade 26 according to some embodiments, the platform 32 has a seal pin groove 81 in which a seal pin not illustrated for sealing a gap between the platform 32 and the platform 32 of another rotor blade 26 adjacent in the circumferential direction is arranged. In the rotor blade 26 according to some embodiments, the seal pin groove 81 is formed on an end surface 32*b* on a suction side 58 side (suction-side) of the platform 32.

In the rotor blade 26 according to some embodiments, an end surface 32*c* on the pressure side 56 side (pressure-side) of the platform 32 includes a plane 32*p* that can come into contact with a seal pin not illustrated arranged at a position opposing the end surface 32*c*.

Groove Portion 70

As described above, the groove portion 70 is formed so as to be recessed from the end surface 32*a* on the trailing edge 46 side of the platform 32 toward the leading edge 44 side. The trailing edge 46 of the blade portion 42 is provided in proximity to the end surface 32*a* on the trailing edge 46 side of the platform 32.

Therefore, a bottom portion 71 of the groove portion 70 is formed at a position recessed toward the leading edge 44 side from the end surface 32*a* on the trailing edge 46 side of the platform 32 relative to the end portion (trailing edge end 46*a*) on the trailing edge 46 side of the blade portion 42.

In the rotor blade 26 according to some embodiments, the bottom portion 71 of the groove portion 70 is positioned closest to the leading edge 44 side in the cross section of the rotor blade 26 when viewed from the circumferential direction, that is, the position closest to the upstream side of the turbine 6 along the axial direction of the rotor 8 (hereinafter, also referred to as simply "axial direction").

The thermal stress acting on the blade portion 42 in a transient state such as when the operation of the gas turbine 1 is started or when the operation is stopped is particularly liable to increase in the vicinity of the root part between the trailing edge 46 of the blade portion 42 and the platform 32.

As a result of intensive studies by the inventors, it has been found that in order to effectively suppress thermal stress in the vicinity of the root part between the trailing edge 46 of the blade portion 42 and the platform 32, which tends to have particularly large thermal stress, it is preferable to suppress strength of a region of the platform 32 that restrains the root part by forming the groove portion 70 such that the groove portion 70 exists immediately below (radially inside) the trailing edge end 46*a* of the blade portion 42.

However, in the rotor blade 26, the serpentine cooling flow path (cooling flow path 60) is formed inside the blade portion 42 for cooling the blade portion 42. As described above, the cooling flow path 60 extends over a range in the blade length direction that includes at least a part of the platform 32. Therefore, the groove portion 70 formed in the platform 32 needs to be formed at a position where a wall thickness with the cooling flow path 60 is ensured. Therefore, there is a limitation in the depth of the groove portion 70.

As illustrated in FIGS. 3A, 3B, 3C, and 3D, the vicinity of the trailing edge 46 of the blade portion 42 is a site of the blade portion 42 closest to the end surface 32*a* on the trailing edge 46 side of the platform 32 and the end surface 32*c* on the pressure side 56 side of the platform 32.

As illustrated in FIGS. 3A, 3B, 3C, and 3D, the cooling flow path 60 closest to the end surface 32*a* on the trailing edge 46 side of the platform 32 is a cooling flow path 61 on the most trailing edge 46 side. The vicinity of the end portion (trailing edge end 61*a*) on the trailing edge 46 side in this cooling flow path 61 is a site closest to the end surface 32*a* on the trailing edge 46 side of the platform 32 and the end surface 32*c* on the pressure side 56 side of the platform 32.

Therefore, in the rotor blade 26 according to some embodiments, in consideration of the position of the trailing edge 46 of the blade portion 42 described above and the position of the cooling flow path 61 on the most trailing edge 46 side, as illustrated in FIGS. 3A, 3B, 3C, and 3D, the groove portion 70 is formed such that the depth of the groove portion 70 is relatively deep in the vicinity of the trailing edge end 46*a* of the blade portion 42 when viewed from the radial direction, and is relatively shallow at a position away from the trailing edge end 46*a* of the blade portion 42 in the circumferential direction.

Specifically, the groove portion 70 includes a suction-side region 72 that is relatively shallow at a position away from the trailing edge end 46*a* of the blade portion 42 in the circumferential direction, a pressure-side region 73 that is relatively deep in the vicinity of the trailing edge end 46*a* of the blade portion 42, and an intermediate region 74 connecting the suction-side region 72 and the pressure-side region 73.

More specifically, as illustrated in FIG. 4, the bottom portion 71 of the groove portion 70 overlaps at least the blade portion 42 when viewed from the radial direction.

When an end portion 71*a* on the pressure side 56 side of the platform 32 with respect to the bottom portion 71 is defined as a first point P1, a tangent line that is a tangent line of the bottom portion 71 at the first point P1 and extends along a plane PL (for example, a plane corresponding to the paper surface in FIG. 4) intersecting the radial direction is defined as a first tangent line Lt1.

When an intersection between a line segment Ls connecting the trailing edge end 61*a* of the cooling flow path 61 on the most trailing edge 46 side provided inside the blade portion 42 when viewed from the radial direction and the trailing edge end 46*a* of the blade portion 42 and the bottom portion 71 is defined as a second point P2, a tangent line that is a tangent line of the bottom portion 71 at the second point P2 and extends along the plane PL is defined as a second tangent line Lt2. An intersection of the first tangent line Lt1 and the second tangent line Lt2 when viewed from the radial direction is defined as a third point P3. When viewed from the radial direction, the third point P3 exists on the side opposite to the trailing edge end 46*a* of the blade portion 42 across a straight line SL connecting the first point P1 and the second point P2.

The above condition is satisfied in any groove portion 70 illustrated in FIGS. 3A, 3B, 3C, and 3D.

Since the first point P1 is the intersection point between the bottom portion 71 when viewed from the radial direction and the end surface 32*c* on the pressure side 56 side of the platform 32, strictly speaking, the first tangent line Lt1 is not uniquely determined. Therefore, the first point P1 refers to a position that is away in the circumferential direction from a site that is very close to the intersection, the site where chamfering or light chamfering at the intersection is performed to a position not affected by the chamfering or the light chamfering.

By configuring the groove portion 70 as described above, the bottom portion 71 is formed at a position recessed toward the leading edge 44 side from the end surface 32*a* on the trailing edge 46 side of the platform 32 relative to the trailing edge end 46*a* of the blade portion 42. Therefore, since the groove portion 70 exists at a position overlapping the trailing edge end 46*a* of the blade portion 42 when viewed from the radial direction, the strength of the platform 32 immediately below (radially inside) the trailing edge end 46*a* of the blade portion 42 can be suppressed, and the thermal stress generated in the vicinity of the trailing edge end 46*a* of the blade portion 42 in the transient state of the gas turbine 1 can be effectively reduced.

By configuring the groove portion 70 as described above, the bottom portion 71 is formed so as to be directed to the end surface 32*a* on the trailing edge 46 side of the platform 32, that is, so as to be directed to an axially downstream side of the rotor 8 toward the suction side 58 from the second point P2. Therefore, the bottom portion 71 is suppressed from approaching the cooling flow path 61 from the second point P2 toward the suction side 58, and therefore the wall thickness between the groove portion 70 and the cooling flow path 61 can be easily secured.

Therefore, the rotor blade 26 according to some embodiments makes it possible to effectively reduce the thermal stress generated in the vicinity of the trailing edge end 46*a* of the blade portion 42 in the transient state of the gas turbine 1 while ensuring the wall thickness between the groove portion 70 and the cooling flow path 61.

In the gas turbine 1 including the rotor blade 26 having the groove portion 70 configured as described above, since it is possible to effectively reduce the thermal stress generated in the vicinity of the trailing edge end 46*a* of the blade portion 42 in the transient state of the gas turbine 1 while ensuring the wall thickness between the groove portion 70 and the cooling flow path 61, it is possible to improve durability of the gas turbine 1.

In the rotor blade 26 according to some embodiments, when viewed from the radial direction, the bottom portion 71 preferably intersects the suction side 58 and the pressure side 56 outside of a first virtual circle Cv1 centered on the trailing edge end 46*a* of the blade portion 42 and passing over the line segment Ls. This condition is satisfied also in any groove portion 70 illustrated in FIGS. 3A, 3B, 3C, and 3D.

The radius of the first virtual circle Cv1 can be obtained, for example, by stress analysis or the like as a size that can effectively reduce the thermal stress generated in the vicinity of the trailing edge end 46*a* of the blade portion 42 in the transient state of the gas turbine 1.

This makes it possible to efficiently suppress the strength of the platform 32 immediately below (radially inside) the trailing edge end 46*a* of the blade portion 42.

In the rotor blade 26 according to some embodiments, when viewed from the radial direction, the bottom portion 71 preferably intersects the suction side 58 outside of a second virtual circle Cv2 centered on the trailing edge end 61*a* of the cooling flow path 61 and passing over the line segment Ls. This condition is satisfied also in any groove portion 70 illustrated in FIGS. 3A, 3B, 3C, and 3D.

The radius of the second virtual circle Cv2 is preferably a thickness required as a wall thickness between the groove portion 70 and the cooling flow path 61, for example.

This makes it possible to secure the wall thickness between the groove portion 70 and the cooling flow path 61 by at least the radius of the second virtual circle Cv2.

In the rotor blade 26 according to some embodiments, a depth dp of the groove portion 70 recessed from the end surface on the trailing edge 46 side (that is, the end surface 32*a* on the trailing edge 46 side of the platform 32) toward the leading edge 44 side is preferably deeper on the pressure side 56 side than on the suction side 58 side. Specifically, the depth dp of the pressure-side region 73 is preferably deeper than the depth dp of the suction-side region 72. This condition is satisfied also in any groove portion 70 illustrated in FIGS. 3A, 3B, 3C, and 3D.

This makes the depth dp relatively shallow, the depth dp of the groove portion 70 (that is, the suction-side region 72) at a position away toward the suction side 58 side along the circumferential direction relative to the trailing edge end 46*a*, which is low in contribution to suppressing the strength of the platform 32 immediately below (radially inside) the trailing edge end 46*a* of the blade portion 42. In general, the groove portion 70 is formed by electrical discharge machining, and therefore the shallower the depth of the groove portion 70 is, the more the processing cost can be suppressed.

Therefore, the rotor blade 26 according to some embodiments makes it possible to provide the groove portion 70 capable of suppressing the processing cost while effectively suppressing the strength of the platform 32 immediately below (radially inside) the trailing edge end 46*a* of the blade portion 42.

Due to the depth dp of the suction-side region 72 becoming relatively shallow, the groove portion 70 and the seal pin groove 81 become less likely to interfere with each other, and therefore the seal pin groove 81 becomes easily formed on the end surface 32*b* on the suction side 58 side of the platform 32. This makes it not necessary to provide the seal pin groove 81 on the end surface 32*c* on the pressure side 56 side of the platform 32, and therefore, it is relatively easy to deepen the depth dp of the pressure-side region 73.

In the rotor blade 26 according to some embodiments, the depth dp of the groove portion 70 may be constant at a position away from the trailing edge end 46*a* of the blade portion 42 relative to an intersection position P4 between the bottom portion 71 and the suction side 58 when viewed from the radial direction. Specifically, in the suction-side region 72, the depth dp may be constant in at least a part of the region. This condition is satisfied in the groove portion 70 illustrated in FIGS. 3A and 3B.

This can simplify the shape of the groove portion 70, and can suppress the processing cost of the groove portion 70.

In the rotor blade 26 according to some embodiments, the depth dp of the groove portion 70 may include the first point P1, and may be constant in at least a part of the region between the first point P1 and an intersection position P5 between the bottom portion 71 and the pressure side 56 when viewed from the radial direction. Specifically, the pressure-side region 73 may have a constant depth dp in at least a part of the region. This condition is satisfied in the groove portion 70 illustrated in FIGS. 3A, 3C, and 3D.

This makes it easy to avoid interference between the groove portion 70 and a seal pin not illustrated for sealing a gap between the platform 32 and the platform 32 of another rotor blade 26 adjacent in the circumferential direction while ensuring the depth of the groove portion 70 on the pressure-side (pressure side 56 side).

In the groove portion 70 illustrated in FIGS. 3A, 3B, 3C, and 3D, the bottom portion 71 extends linearly when viewed from the radial direction, but may extend in a curved shape.

In the rotor blade 26 according to some embodiments, as described above, the seal pin groove 81 is preferably formed on the end surface 32*b* on the suction side 58 side of the platform 32. The end surface 32*c* on the pressure side 56 side of the platform 32 preferably includes the plane 32*p* that can come into contact with a seal pin not illustrated arranged at the position opposing the end surface 32*c*.

This makes it easy to secure a region (plane 32*p*) to be a plane on the end surface 32*c* on the pressure side 56 side of the platform 32. Therefore, it becomes easy to deepen the groove portion 70 in the vicinity of the end surface 32*c* on the pressure side 56 side of the platform 32. Therefore, it becomes easy to suppress the strength of the platform 32 immediately below (radially inside) the trailing edge end 46*a* of the blade portion 42.

The disclosure is not limited to the above-described embodiments, and includes embodiments obtained by modifying the above-described embodiments and embodiments obtained by appropriately combining these embodiments.

For example, also the rotor blade 26 having the groove portion 70 in which the suction-side region 72, the pressure-side region 73, and the intermediate region 74 as illustrated in FIGS. 3A, 3B, 3C, and 3D are appropriately combined achieves the above-described functions and effects.

Each of the contents described in the above embodiments is grasped as follows, for example. (1) The gas turbine rotor blade 40 (rotor blade 26) according to at least one embodiment of the disclosure includes: the base end portion (blade root portion 34) fixed to the rotor 8; the blade-shaped portion (blade portion 42) extending in the radial direction of the rotor 8 and having a pressure-side blade surface and a suction-side blade surface, the blade surfaces forming a blade shape between the leading edge 44 and the trailing edge 46; and the platform 32 provided between the base end portion (blade root portion 34) and the blade-shaped portion (blade portion 42). The platform 32 includes the groove portion 70 recessed from the end surface 32*a* on the trailing edge 46 side toward the leading edge 44 side and extending in the circumferential direction of the rotor 8. The bottom portion 71 of the groove portion 70 overlaps at least the blade-shaped portion (blade portion 42) when viewed from the radial direction. When the end portion 71*a* on the pressure-side (pressure side 56 side) of the platform 32 with respect to the bottom portion 71 is defined as the first point P1, the tangent line that is a tangent line of the bottom portion 71 at the first point P1 and extends along the plane PL intersecting the radial direction is defined as the first tangent line Lt1. When the intersection between the line segment Ls connecting the bottom portion 71 and the end portion (trailing edge end 61*a*) on the trailing edge 46 side of the serpentine cooling flow path (cooling flow path 61) provided inside the blade-shaped portion (blade portion 42) when viewed from the radial direction and the end portion (trailing edge end 46*a*) on the trailing edge 46 side of the blade portion 42 is defined as the second point P2, the tangent line that is a tangent line to the bottom portion 71 at the second point P2 and extends along the plane PL is defined as the second tangent line Lt2. An intersection of the first tangent line Lt1 and the second tangent line Lt2 when viewed from the radial direction is defined as a third point P3. When viewed from the radial direction, the third point P3 exists on the side opposite to the end portion (trailing edge end 46*a*) on the trailing edge 46 side of the blade portion 42 across the straight line SL connecting the first point P1 and the second point P2.

According to the configuration of (1) described above, the bottom portion 71 is formed at a position recessed toward the leading edge 44 side from the end surface 32*a* on the trailing edge 46 side of the platform 32 relative to the end portion (trailing edge end 46*a*) on the trailing edge 46 side of the blade-shaped portion (blade portion 42). Therefore, since the groove portion 70 exists at a position overlapping the end portion (trailing edge end 46*a*) on the trailing edge 46 side of the blade-shaped portion (blade portion 42) when viewed from the blade length direction (radial direction), the strength of the platform 32 immediately below (radially inside) the end portion (trailing edge end 46*a*) on the trailing edge 46 side of the blade-shaped portion (blade portion 42) can be suppressed, and the thermal stress generated in the vicinity of the end portion (trailing edge end 46*a*) on the trailing edge 46 side of the blade-shaped portion (blade portion 42) in the transient state of the gas turbine 1 can be effectively reduced.

According to the configuration of (1) described above, the bottom portion 71 is formed so as to be directed to the end surface 32*a* on the trailing edge 46 side of the platform 32, that is, so as to be directed to an axially downstream side of the rotor 8 toward the suction-side blade surface (suction side 58) from the second point P2. Therefore, the bottom portion 71 is suppressed from approaching the serpentine cooling flow path (cooling flow path 61) from the second point P2 toward the suction-side blade surface (suction side 58), and therefore the wall thickness between the groove portion 70 and the serpentine cooling flow path (cooling flow path 61) can be easily secured.

Therefore, the configuration of (1) described above makes it possible to effectively reduce the thermal stress generated in the vicinity of the end portion (trailing edge end 46*a*) on the trailing edge 46 side of the blade-shaped portion (blade portion 42) in the transient state of the gas turbine 1 while ensuring the wall thickness between the groove portion 70 and the serpentine cooling flow path (cooling flow path 61).

(2) In some embodiments, in the configuration of (1) described above, when viewed from the radial direction, the bottom portion 71 preferably intersects the suction-side blade surface (suction side 58) and the pressure-side blade surface (pressure side 56) outside of the first virtual circle Cv1 centered on the end portion (trailing edge end 46*a*) on the trailing edge 46 side of the blade-shaped portion (blade portion 42) and passing over the line segment Ls.

The configuration of (2) described above makes it possible to efficiently suppress the strength of the platform 32 immediately below (radially inside) the end portion (trailing edge end 46*a*) on the trailing edge 46 side of the blade-shaped portion (blade portion 42).

(3) In some embodiments, in the configuration of (1) or (2) described above, when viewed from the radial direction, the bottom portion 71 preferably intersects the suction-side blade surface (suction side 58) outside of the second virtual circle Cv2 centered on the end portion (trailing edge end 61*a*) on the trailing edge 46 side of the serpentine cooling flow path (cooling flow path 61) and passing over the line segment Ls.

The configuration of (3) described above makes it possible to secure the wall thickness between the groove portion 70 and the serpentine cooling flow path (cooling flow path 61) by at least the radius of the second virtual circle Cv2.

(4) In some embodiments, in the configuration of any of (1) to (3) described above, the depth dp of the groove portion 70 recessed from the end surface on the trailing edge 46 side (that is, the end surface 32*a* on the trailing edge 46 side of the platform 32) toward the leading edge 44 side is preferably deeper on the pressure-side (pressure side 56 side) than on the suction-side (suction side 58 side).

The configuration of (4) described above makes the depth dp relatively shallow, the depth dp of the groove portion 70 at the position away toward the suction-side (suction side 58 side) along the circumferential direction relative to the end portion (trailing edge end 46*a*), which is low in contribution to suppressing the strength of the platform 32 immediately below (radially inside) the end portion (trailing edge end 46*a*) on the trailing edge 46 side of the blade-shaped portion (blade portion 42). In general, the groove portion 70 is formed by electrical discharge machining, and therefore the shallower the depth of the groove portion 70 is, the more the processing cost can be suppressed.

The configuration of (4) described above makes it possible to provide the groove portion 70 capable of suppressing the processing cost while effectively suppressing the strength of the platform 32 immediately below (radially inside) the end portion (trailing edge end 46*a*) on the trailing edge 46 side of the blade-shaped portion (blade portion 42).

(5) In some embodiments, in the configuration of any of (1) to (4) described above, the depth dp of the groove portion 70 recessed from the end surface on the trailing edge 46 side (that is, the end surface 32*a* on the trailing edge 46 side of the platform 32) toward the leading edge 44 side may be constant at a position away from the end portion (trailing edge end 46*a*) on the trailing edge 46 side of the blade-shaped portion (blade portion 42) relative to the intersection position P4 between the bottom portion 71 and the suction-side blade surface (suction side 58) when viewed from the radial direction.

The configuration of (5) described above can simplify the shape of the groove portion 70, and can suppress the processing cost of the groove portion 70.

(6) In some embodiments, in the configuration of any of (1) to (5) described above, the depth dp of the groove portion 70 recessed from the end surface on the trailing edge 46 side (that is, the end surface 32*a* on the trailing edge 46 side of the platform 32) toward the leading edge 44 side may be at least partially constant in the region between the first point P1 and the intersection position P5 between the bottom portion 71 and the pressure-side blade surface (pressure side 56) when viewed from the radial direction, the region including the first point P1.

The configuration of (6) described above makes it easy to avoid interference between the groove portion 70 and a seal pin for sealing a gap between the platform 32 and the platform 32 of another gas turbine rotor blade (rotor blade 26) adjacent in the circumferential direction while ensuring the depth dp of the groove portion 70 on the pressure-side (pressure side 56).

(7) In some embodiments, in the configuration of any of (1) to (6) described above, the platform 32 preferably includes the seal pin groove 81 in which a seal pin for sealing a gap between the platform 32 and the platform 32 of another gas turbine rotor blade 40 (rotor blade 26) adjacent in the circumferential direction is arranged. The seal pin groove 81 is preferably formed on the end surface 32*b* on the suction-side (suction side 58 side) of the platform 32. The end surface 32*c* on the pressure-side (pressure side 56) of the platform 32 preferably includes the plane 32*p* that can come into contact with a seal pin arranged at the position opposing the end surface 32*c*.

The configuration of (7) described above makes it easy to secure a region (plane 32*p*) to be a plane on the end surface 32*c* on the pressure-side (pressure side 56) of the platform 32. Therefore, it becomes easy to deepen the groove portion 70 in the vicinity of the end surface 32*c* on the pressure-side (pressure side 56) of the platform 32. This makes it easy to suppress the strength of the platform 32 immediately below (radially inside) the end portion (trailing edge end 46*a*) on the trailing edge 46 side of the blade-shaped portion (blade portion 42).

(8) The gas turbine 1 according to at least one embodiment of the disclosure includes: the rotor 8; and the gas turbine rotor blade 40 (rotor blade 26) having the configuration of any of (1) to (7) described above fixed to the rotor 8 at the base end portion (blade root portion 34).

According to the configuration of (8) described above, since it is possible to effectively reduce the thermal stress generated in the vicinity of the end portion (trailing edge end 46*a*) on the trailing edge 46 side of the blade-shaped portion (blade portion 42) in the transient state of the gas turbine 1 while ensuring the wall thickness between the groove portion 70 and the serpentine cooling flow path (cooling flow path 61), it is possible to improve durability of the gas turbine 1.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A gas turbine rotor blade comprising:

a base end portion fixed to a rotor;

a blade-shaped portion extending in a radial direction of the rotor and having a pressure-side blade surface and a suction-side blade surface, the blade surfaces forming a blade shape between a leading edge and a trailing edge of the blade-shaped portion; and a platform provided between the base end portion and the blade-shaped portion, wherein the platform includes a groove portion recessed from an end surface on the trailing edge side toward the leading edge side and extending in a circumferential direction of the rotor, a bottom portion of the groove portion overlaps at least the blade-shaped portion when viewed from the radial direction, when a pressure-side end portion of the platform with respect to the bottom portion is defined as a first point, a tangent line that is a tangent line of the bottom portion at the first point and extends along a plane intersecting the radial direction is defined as a first tangent line, when an intersection between a line segment connecting the bottom portion and an end portion on the trailing edge side of a serpentine cooling flow path provided inside the blade-shaped portion when viewed from the radial direction and an end portion on the trailing edge side of the blade-shaped portion is defined as a second point, a tangent line that is a tangent line of the bottom portion at the second point and extends along the plane is defined as a second tangent line, when an intersection between the first tangent line and the second tangent line when viewed from the radial direction is defined as a third point, when viewed from the radial direction, the third point exists on a side opposite to the end portion on the trailing edge side of the blade-shaped portion across a straight line connecting the first point and the second point.

2. The gas turbine rotor blade according to claim 1, wherein when viewed from the radial direction, the bottom portion intersects the suction-side blade surface and the pressure-side blade surface outside of a first virtual circle centered on the end portion on the trailing edge side of the blade-shaped portion and passing over the line segment.

3. The gas turbine rotor blade according to claim 1, wherein when viewed from the radial direction, the bottom portion intersects the suction-side blade surface outside of a second virtual circle centered on an end portion on the trailing edge side of the serpentine cooling flow path and passing over the line segment.

4. The gas turbine rotor blade according to claim 1, wherein a depth of the groove portion recessed from the end surface on the trailing edge side toward the leading edge side is deeper on the pressure-side than on the suction-side.

5. The gas turbine rotor blade according to claim 1, wherein a depth of the groove portion recessed from the end surface on the trailing edge side toward the leading edge side is constant at a position away from the end portion on the trailing edge side of the blade-shaped portion relative to an intersection position between the bottom portion and the suction-side blade surface when viewed from the radial direction.

6. The gas turbine rotor blade according to claim 1, wherein a depth of the groove portion recessed from the end surface on the trailing edge side toward the leading edge side is at least partially constant in a region between the first point and an intersection position between the bottom portion and the pressure-side blade surface when viewed from the radial direction, the region including the first point.

7. The gas turbine rotor blade according to claim 1, wherein the platform includes a seal pin groove in which a seal pin for sealing a gap between the platform and a platform of another gas turbine rotor blade adjacent to each other in the circumferential direction is arranged, the seal pin groove is formed on an end surface on a suction-side of the platform, and an end surface on a pressure-side of the platform includes a plane that can come into contact with a seal pin arranged at a position opposing the end surface.

8. A gas turbine comprising:

the rotor; and the gas turbine rotor blade according to claim 1 fixed to the rotor at the base end portion.

* * * * *